United States Patent [19]

Illy

[11] 4,429,623
[45] Feb. 7, 1984

[54] COFFEE-MAKING MACHINE

[76] Inventor: Ernesto Illy, 8, via Locchi, I - Trieste, Italy

[21] Appl. No.: 369,516

[22] Filed: Apr. 19, 1982

[30] Foreign Application Priority Data

Jul. 16, 1981 [IT] Italy ............................. 22376/81[U]

[51] Int. Cl.³ .......................................... A47J 31/24
[52] U.S. Cl. .................................... 99/295; 99/302 R
[58] Field of Search .................... 99/295, 298, 302 R, 99/307, 316, 284, 290, 291

[56] References Cited

U.S. PATENT DOCUMENTS

| | | | |
|---|---|---|---|
| 3,232,213 | 2/1966 | Valente | 99/302 |
| 4,253,385 | 3/1981 | Illy | 99/295 |
| 4,254,694 | 3/1981 | Illy | 99/295 |
| 4,280,401 | 7/1981 | Cleland | 99/295 |

*Primary Examiner*—Robert W. Jenkins
*Attorney, Agent, or Firm*—Kontler, Grimes & Battersby

[57] ABSTRACT

An expresso machine has a hot water distributor and an adapter which is removably connectable to the distributor to receive hot water therefrom. A box is in turn removably connectable to the adapter and defines with the same an extraction chamber adapted to house a prefabricated coffee pod through which the hot water must pass on its way to an outlet of the box, thus brewing a portion of coffee.

9 Claims, 2 Drawing Figures

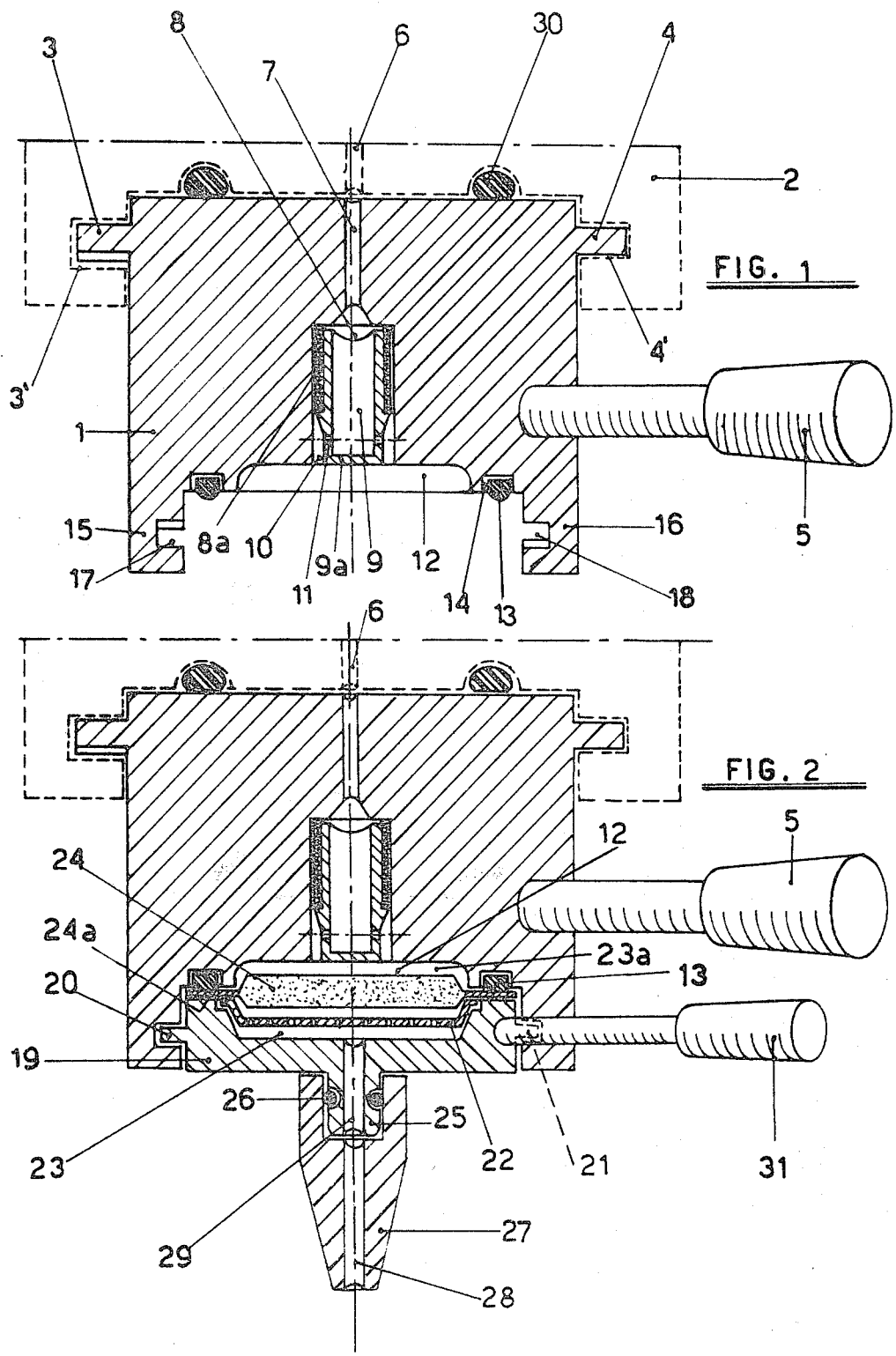

COFFEE-MAKING MACHINE

BACKGROUND OF THE INVENTION

The present invention relates to a coffee machine.

More particularly, the invention relates to an espresso coffee machine.

Traditional espresso coffee machines, of the Italian type used in bars, restaurants and coffee shops, are constructed to brew coffee by passing hot water through a quantity of ground coffee which is placed into a filter inside a receptacle.

Removal of the receptacle, used coffee and filter, and reinstallation of the receptacle with new supplies, is not difficult but does require the services of an operator who must be paying attention to this work. In restaurants and similar establishments these operators are, however, often distracted by other demands which are made on them. This having been recognized, prefabricated pods of coffee have been developed which require no filter, no pouring, and no measuring, but are simply slipped into a chamber provided for them in the coffee machine. Unfortunately these pods, each of which equals one brewing measure and is formed by compressing ground coffee between two layers of water-permeable filter paper, cannot be used in the conventional coffee machines. The pods do not fit the receptacles of those machines and are only suitable for use in an extraction chamber of the type disclosed in U.S. Pat. No. 4,254,694. Nevertheless, in view of their advantages it would evidently be also desirable to be able to use such pods in conventional machines.

SUMMARY OF THE INVENTION

It is, accordingly, an object of the invention to provide prefabricated coffee pods which may be used in conventional coffee machines.

A more particular object is to allow the use of such coffee pods in conventional coffee machines by retrofitting the conventional machines with an adapter.

In keeping with these objects, and with still others which will become apparent hereafter, one aspect of the invention resides in a coffee machine which, briefly stated, may comprise a removable adapter;

connecting means for connecting the adapter to the distributor of the machine so as to receive hot water from the distributor; and a box removably connectable to the adapter and defining therewith an extraction chamber in which a prefabricated water-permeable coffee pod may be installed prior to connection of the box to the adapter.

The invention will hereafter be described with reference to an exemplary embodiment as illustrated in the appended drawings. It is to be understood, however, that this embodiment is shown only to illustrate the invention and is not to be considered limiting of the scope or possible modifications of the invention.

BRIEF DESCRIPTION OF THE DRAWINGS

FIG. 1 is a vertical cross-section of an adapter embodying the invention, installed in a retrofitted conventional coffee machine; and FIG. 2 is a view analogous to FIG. 1 but showing the adapter, a box for the same and a coffee pod in the extraction chamber.

DESCRIPTION OF PREFERRED EMBODIMENTS

FIGS. 1 and 2 fragmentarily (broken lines) illustrate a conventional coffee-brewing machine 2 and an adapter 1 for retrofitting it with the present invention. The adapter 1 is applied to the hot water distributor of the machine 2 and water leakage between them is prevented by a seal 30 (e.g. O-ring seal of rubber or synthetic plastic material). Adapter 1 has ribs or wings 3, 4 which are inserted into slots or grooves 3', 4' of the machine 2 (these slots are present in any case so as to hold the conventional coffee container which is removed when adapter 1 is to be installed) in order to connect the two together. For ease of handling the adapter 1 may be provided with a handle 5.

The adapter is provided with a passage 7 which, when the adapter is installed on the machine 2, has a vertical orientation. The machine 2 itself, or rather its hot water distributor, is provided with a vertical passage 6 with which the passage 7 is aligned and in communication. The lower end portion of passage 7 is enlarged so as to form a cylindrical chamber 8 the inner wall of which contains part of a screw thread 8a adapted to threadably receive a diffuser 9 which is screwed into this thread 8a. The bottom of diffuser 9 is spaced from the cylindrical wall of chamber 8 to define with this wall a space 10. In the region of this space 10 the diffuser 9 is closed by a transverse wall 9a. Openings 11 are provided in diffuser 9 to permit water to flow outwardly from the diffuser 9. Underneath this wall 9a the adapter 1 includes at its lower end a flat chamber 12 of circular cross-section which is concentric to chamber 8 and communicates therewith via the space 10. A circular seal (e.g. O-ring) 13 of rubber or synthetic plastic material is partially received in a similarly circular recess 14 of the adapter 1, surrounding the chamber 12. Extensions 15, 16 of the adapter are provided with slots 17, 18 which serve for applying a box 19 to the adapter.

FIG. 2 shows the box 19 which has ribs or wings 20, 21 which are receivable in the slots 17, 18 in order to releasably connect the box to the adapter 1. Box 19 also has a depression or recess in which a filter 22 is received and which defines with the bottom surface of the recess a chamber 23. A prefabricated (i.e. commercially available) coffee pod 24 is received in the extraction chamber 23a defined within the chamber 12 by the filter 22. The pod 24 has a circular peripheral edge portion constituted by the overlapped and connected edges of two overlying layers of water-permeable filter paper; edge portion 24a is water-tightly clamped between seal 13 and the flat upper surface of box 19. A hollow extension 25 of box 19 projects downwardly therefrom and includes a sealing ring 26 (e.g. O-ring) of rubber or synthetic plastic material, about which a nozzle 27 is engaged in such a manner that passages 28 and 29 of the nozzle 27 and of the extension 25, respectively, are coaxial and in communication with one another and with chamber 23. For ease of manipulation the box 19 may be provided with a handle 31.

In the operation of a coffee machine retrofitted with the inventive structure as described above, an operator applies to adapter 1 under the hot water distributor of the machine 2, places a pod 24 over the filter 22 in box 19 and applies the box to the adapter 1. The operator then operates the machine in the normal manner, so that hot water is delivered which passes from passage 6 into passage 7 and diffuser 9, flows out through openings 11, spreads through chamber 12 and penetrates through pod 24. Coffee is thus brewed which passes through the filter 22 and runs off through the outlet passages 28 and 29.

By resorting to the invention a conventional coffee machine, e.g. an espresso machine, can be either permanently retrofitted to operate with the advantageous prefabricated coffee pods, or it can even be selectively operated in two modes; i.e. by using either loose ground coffee or, at the option of an operator, using coffee pods. Furthermore, the invention makes it possible to offer single-serving coffee products of a particular nature. For example, it is a simple matter to brew a cup of caffeine-free coffee, using the adapter 1, if the operator has a pod 24 of such coffee on hand.

While the invention has hereinbefore been described with reference to a specific exemplary embodiment, it is not, however, intended to thereby limit the invention to the illustrated embodiment and any and all changes and modifications that may offer themselves are intended to be encompassed within the scope of the appended claims.

I claim:

1. In a coffee machine heretofore adapted to brew coffee by passing hot water from a distributor through a quantity of ground coffee loosely placed in a filter inside a receptacle, a combination comprising:
    a removable adapter adapted to replace said receptacle and permit said coffee machine to brew coffee using a prepackaged, water-permeable coffee pod;
    connecting means for connecting the adapter to the distributor of the machine; and
    a removable box adapted to be connected to the adapter and define therewith an extraction chamber into which said coffee pod may be inserted prior to connection of said box to said adapter.

2. A combination as defined in claim 1, said extraction chamber having an outlet for the brewed coffee; and said box further comprising a filter interposed in said extraction chamber intermediate said outlet and the coffee pod.

3. A combination as defined in claim 1, wherein said connecting means are configurated to engage with cooperating means present on said machine.

4. A combination as defined in claim 1, said adapter including a passage communicating with a hot-water delivery passage of said distributor, a front substantially cylindrical chamber communicating with said passage of said adapter, a hot-water diffuser in said front chamber and having a plurality of openings for passing hot water from the diffuser into a second substantially flat and circular chamber in the adapter, and means for sealingly engaging said adapter and box circumambiently of said second chamber.

5. A combination as defined in claim 4, and further comprising a handle on said adapter for manipulating the latter.

6. A combination as defined in claim 4, said diffuser having a bottom wall and a circumferential wall, and said openings being provided in said circumferential wall upwardly of said bottom wall, said diffuser defining with a lower part of the wall bounding said front chamber an annular space with which said openings communicate and which in turn communicates with said second chamber.

7. A combination as defined in claim 1, said box including connecting means for releasably connecting the box to said adapter, a recess formed in a surface of the box which in assembled condition faces said adapter, a filter in said recess and defining with the same said extraction chamber, a projection extending downwardly from said box and having an outlet passage communicating with said extraction chamber, and a nozzle surrounding said projection and having an outlet communicating with said outlet passage.

8. A combination as defined in claim 7; and further comprising a handle as said box for manipulating the latter.

9. In a coffee machine heretofore adapted to brew coffee by passing hot water from a distributor through a quantity of ground coffee loosely placed in a filter inside a receptacle, a combination comprising:
    a removable adapter adapted to replace said receptacle and permit said coffee machine to brew coffee using a prepackaged, water-permeable coffee pod, said adapter including a passage communicating with a hot-water delivery passage of said distributor, a chamber communicating with said passage and a diffuser having a plurality of openings to permit the passage of hot water from the diffuser into a second chamber;
    connecting means for connecting the adapter to the distributor of the machine; and
    a removable box adapted to be sealably connected to the adapter and define therewith an extraction chamber into which said coffee pod may be inserted prior to connection of said box to said adapter.

* * * * *